(12) United States Patent
Purnadi et al.

(10) Patent No.: US 6,708,031 B2
(45) Date of Patent: Mar. 16, 2004

(54) SESSION OR HANDOFF METHODS IN WIRELESS NETWORKS

(75) Inventors: Rene Purnadi, Coppell, TX (US); Yousuf Saifullah, Flower Mound, TX (US)

(73) Assignee: Nokia Corporation, Espoo (FI)

( * ) Notice: Subject to any disclaimer, the term of this patent is extended or adjusted under 35 U.S.C. 154(b) by 469 days.

(21) Appl. No.: 09/729,075

(22) Filed: Dec. 5, 2000

(65) Prior Publication Data

US 2002/0068565 A1 Jun. 6, 2002

(51) Int. Cl.[7] .................................................. H04Q 7/20
(52) U.S. Cl. ........................................ 455/436; 370/331
(58) Field of Search .............................. 455/436, 439, 455/442, 450, 464, 509, 432.1; 370/331

(56) References Cited

U.S. PATENT DOCUMENTS

| | | | |
|---|---|---|---|
| 5,890,064 A | * | 3/1999 | Widergen et al. ............ 455/445 |
| 6,091,757 A | | 7/2000 | Cudak et al. |
| 6,094,581 A | * | 7/2000 | Fried et al. ................... 455/449 |
| 6,230,005 B1 | * | 5/2001 | Le et al. ....................... 455/414.1 |
| 6,438,117 B1 | * | 8/2002 | Grilli et al. ................... 370/331 |
| 6,487,406 B1 | * | 11/2002 | Chang et al. ............. 455/422.1 |
| 6,522,880 B1 | * | 2/2003 | Verma et al. ................ 455/436 |

FOREIGN PATENT DOCUMENTS

| | | | |
|---|---|---|---|
| WO | WO 00/21319 | 4/2000 | |
| WO | 0021319 | 4/2000 | .......... H04Q/12/56 |
| WO | 0191382 | 11/2001 | .......... H04L/12/56 |

OTHER PUBLICATIONS

3rd Generation Partnership Project (3GPP) et al., Universal Mobile Telecommunications Systems (UMTS); TR 23.913 Tubo–Changer Technical Report version, Dec. 13, 1999, pp. 6–18.

* cited by examiner

Primary Examiner—Marsha D. Banks-Harold
Assistant Examiner—Nghi H. Ly
(74) Attorney, Agent, or Firm—Brown Raysman Millstein Felder Steiner

(57) ABSTRACT

A new session or handoff procedure is triggered for a mobile station in a communications network having a packet switched network connected to a wireless network. A data identifier from the wireless network is determined which indicates the location of the mobile station in the wireless network. A list maintained in a gateway connected between the wireless network and the packet switch network associates data identifiers of the packet switched network with data identifiers of the wireless network. The data identifier of the packet switched network indicating the location of the mobile station in the wireless network is determined using the list maintained in the gateway.

35 Claims, 6 Drawing Sheets

SESSION OR HANDOFF METHODS IN WIRELESS NETWORKS

BACKGROUND

1. Field of the Invention

The present invention relates generally to methods and systems providing communications services through wireless networks. Particular aspects of the invention relate to providing communications services through wireless networks connected to packet switched networks and methods of initiating a new session or handoff procedure when providing such services.

2. Discussion of the Related Art

Communications services have historically been provided over circuit-switched networks such as the Public Switched Telephone Network (PSTN), but now they can also be provided over packet switched networks, such as those supporting the Internet Protocol (IP). Many modern communication networks utilize a combination of wireless network equipment (such as cellular phones) and packet switched network equipment (usually network traffic routing equipment) compliant with one or more IP telephony standards such as, for example, the International Telecommunications Union (ITU) H.323 standard or the Internet Engineering Task Force (IETF) specifications.

There have been several proposals for a new $3^{rd}$ generation of communications networks in which a packet switched network, compliant with one or more IP standards, is directly connected to a wireless access network. 3GPP Release '00 (available at www.3gpp.org) uses the General Packet Radio Service (GPRS) packet switched network, a general description of which is documented in 3G TS 23.060 version 3.3.0. The GPRS packet switched network is specified for use with either a Universal Mobile Terrestrial System (UMTS) or a Global System for Mobile Communications (GSM) wireless access network. Another example of a $3^{rd}$ generation communications network is the one in the cdma2000 specification (available at www.3gpp2.org), which includes both a cdma2000 wireless air interface and a cdma2000 packet data solution.

However, even though it may be preferable to use a particular packet switched network in a communications network (for example, a GPRS packet switched network may be preferable because it can serve as the transport layer for real-time applications such as streaming multimedia), there may be a problem using the preferred packet switched network in some circumstances because it is not specified for use, and is incompatible, with the particular wireless access network installed in the communications network (such as a cdma2000 wireless network). Since an installed wireless access network may consist of several thousands of cellular phones and associated base stations, it may not be cost effective or otherwise feasible to overcome the incompatibility or other problems by changing the wireless access network.

There is thus a disadvantage and a problem to be solved of allowing a communications network to include a packet switched network which is not specified for use with the wireless access network installed in the communications network. In particular, the solution to such a problem must allow subscribers of the wireless access network to access and roam between cellular networks and, preferably, access the same services available in their home network when they are visiting in other networks. Therefore, procedures must be developed between the packet switched network and the wireless access network for initiating a new session or providing a handoff for a subscriber of the wireless access network.

BRIEF SUMMARY

The present invention addresses the problems associated with communications networks discussed above. It broadly relates to systems and methods including one or more of the functions of providing, initiating, accessing, utilizing or managing internetworking functions for a communications network having both a wireless access network and a packet switched core network. A particular application of the invention relates to session or handoff methods in which a subscriber initiates a new session or visits a network other than their own network (roams).

The example embodiments of the invention offer a GPRS packet switched core network connected to a cdma2000 wireless access network so that packet data communications services can be easily provided A wireless gateway (WGW) is connected between the Serving GPRS Service Node (SGSN). The WGW uses the information from the cdma2000 wireless network to either initiate a session or perform a handoff of a subscriber.

One exemplary, non-essential, aspect of the invention is a method of triggering a new session or handoff procedure for a user equipment in a communications system having a second network connected to a first network. A first identifier from the first network is determined which indicates the location of the user equipment in the first network. The first identifier is provided to an entity connected to the first network and to the second network. The entity associates a second identifier of the second network with the first identifier of the first network. The first identifier indicates the location of the user equipment in the first network and the second identifier indicates the location of the user equipment in the second network. A second identifier of the second network is determined which indicates the location of the user equipment using said entity for associating the first identifier and the second identifier.

Another exemplary, non-essential, aspect of the invention is a communications system having at least an access network, a core network, and a gateway connected between the access network and the core network. The communications system implements the method described in the previous paragraph to trigger the updating of an identifier in the core network indicating the location of a user equipment in the access network

DETAILED DESCRIPTION

The foregoing and a better understanding of the present invention will become apparent from the following detailed description of example embodiments and the claims when read in connection with the accompanying drawings, all forming a part of the disclosure of the invention. While the following written and illustrated disclosure focuses on disclosing an example embodiment of the invention in which a cdma2000 wireless access network is connected with a GPRS packet switched network, it should be clearly understood that the same is by way of illustration and example only and is not to be taken by way of limitation, the spirit and scope of the present invention being limited only by the terms of the claims in the patent issuing from this application.

In order to understand the background and context for the example embodiment of the invention, it is necessary to understand the different aspects of the both the GPRS packet switched network and the cdma2000 specification.

GPRS Packet Switched Network

Figure 1:
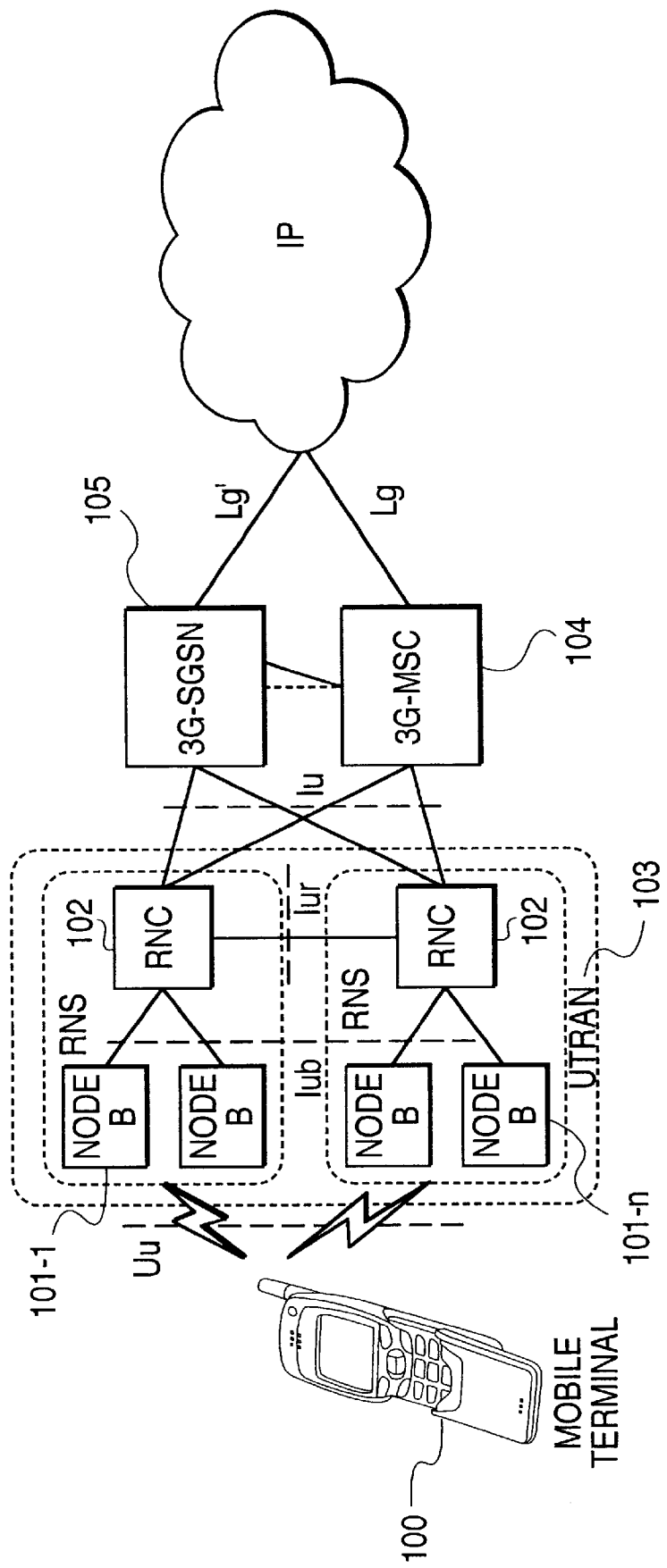
FIG. 1 is a block diagram showing parts of the architecture of a $3^{rd}$ generation communications network having a UMTS wireless network and a GPRS packet switched network.

FIG. 1 is a block diagram of an example of a $3^{rd}$ generation communications network having a UMTS wireless network connected to a GPRS packet switched network. The blocks in FIG. 1 represent different functionalities and do not necessarily correspond to different discrete network elements. There are a plurality of Nodes B 101-1 to 101-n, each one containing a respective Base Station Subsystem (BSS). Each Node B controls radio signal connections with mobile terminals (only one mobile terminal 100 is shown in FIG. 1 for the sake of clarity). Information obtained from the radio signal connections are supplied to a Radio Network Controller (RNC) 102 associated with the base station in Node B. Instructions concerning the timing, the nature and any periodicity of the radio signal connections are either provided by the RNC 102 or are pre-administered in the base station.

The RNC 102 is a radio network controller in the Universal Terrestrial Radio Access Network (UTRAN) and contains functionality required to support procedures in one Public Land Mobile Network (PLMN).

Signaling between a Node B 101-1 to 101-n and a RNC 102 is transferred via the Iub interface, and in some specific periods, via Iur interfaces. The Iur interface supports inter-RNC soft handovers.

UTRAN 103 is involved in RAN level overall controlling of Mobile Terminals 100. Generally, UTRAN 103 provides Cell-ID and timing related data to 3G-MSC 104. The 3G-MSC 104 is similar to the Mobile Services Switching Center (MSC) in a GSM network.

Since Servicing GPRS Support Node (SGSN) 105 has independent mobility managements UTRAN 103 instead provides Cell-ID to SGSN 105. The Iu interface is used between RNCs 102 and 3G-MSC 104 and SGSN 105. The functions of the SGSN are charging, coordination, and authorizations of mobile terminals 100 as far as accesses to the packet switched network are concerned.

The Iu interface provides signaling over Radio Access Network Application Part (RANAP) protocol from the wireless access network (specifically, RNC 102) to the packet switched core network (specifically, 3G-MSC 104 and SGSN 105.) and MT 100 NAS (Non Access Stratum) messages, including paging, authentication, etc., messages over RANAP protocol. The interface also handles state information between UTRAN 103 and 3G-MSC 104.

A Home Location Register (not shown) contains subscription data and routing information concerning subscriber calls. The HLR is preferably accessible via a Mobile Application Part (MAP) interface. An interface passes routing information from the HLR to the rest of the packet switched core network and supports any mobility management related database in the HLR. It can also be used by the packet switched network to request the address of a visited MSC or SGSN for a particular mobile terminal. It is preferably a type of MAP interface and may be implemented over a SS7 signaling network or possibly over IP protocol (MAP over IP). The interface transforms subscriber information needed, for example, for authorization and location access routing. It is preferably a type of MAP interface and may be implemented over a SS7 signaling network or possibly over IP protocol (MAP over IP).

The Lg' interface allows SGSN 104 to access the remainder of the GPRS packet switched network. It may be identical to the Lg interface, but is labeled differently in FIG. 1 to show that it may also be different. The interface transforms subscriber information needed, for example, for authorization and location access routing. It is preferably a type of MAP interface and may be implemented over a SS7 signaling network or possibly over IP protocol (MAP over IP).

Figure 2:
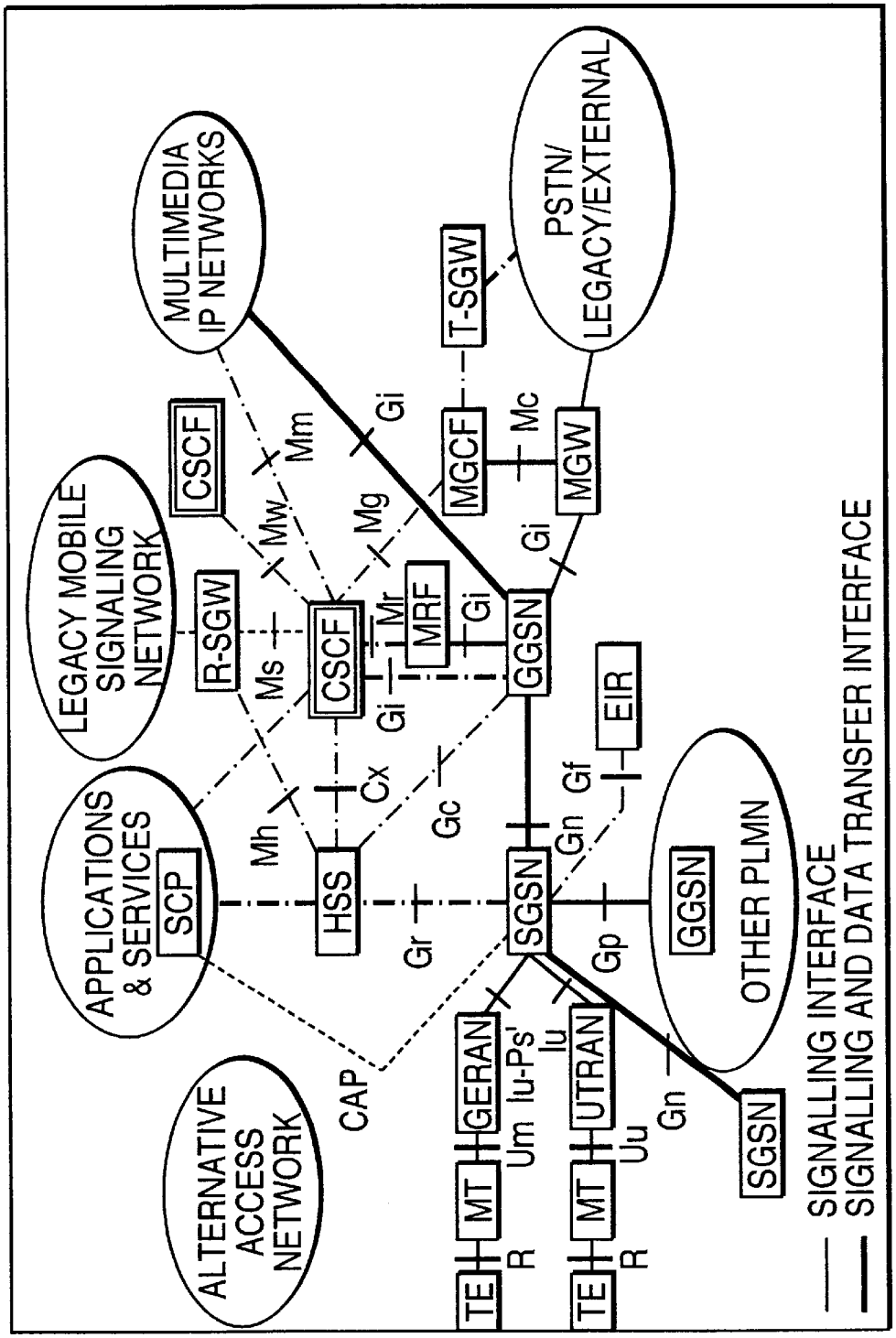
FIG. 2 is an expanded block diagram of the GPRS packet switched network showing possible connections to two types of wireless networks and to other external networks.

FIG. 2 is an additional block diagram showing connections to other networks and, in particular, to two different wireless access networks. In addition to the UTRAN wireless access network connected via the Iu interface, there is also a GERAN wireless access network connected via a Iu-ps interface. The Gateway GPRS Support Node (GGSN) is a gateway to external networks. The Call State Control Function (CSCF) and the GGSN are instrumental in reliably controlling communications services of Mobile Terminals 100 with other networks. In the following description of the example embodiments, the GGSN and CSCF are elements located in a network in which a subscriber is visiting.

The specifications for the GPRS packet switched network have been released by the $3^{rd}$ Generation Partnership Project (www.3gpp.org). Release 00 of the specifications provides that a network subscriber can have one or more packet data protocol (PDP) addresses. The General Packet Radio Service (GPRS) Description, Stage 2, 3G TS 23.060, Version 3.3.0, is hereby incorporated by reference.

CDMA2000

Figure 3:
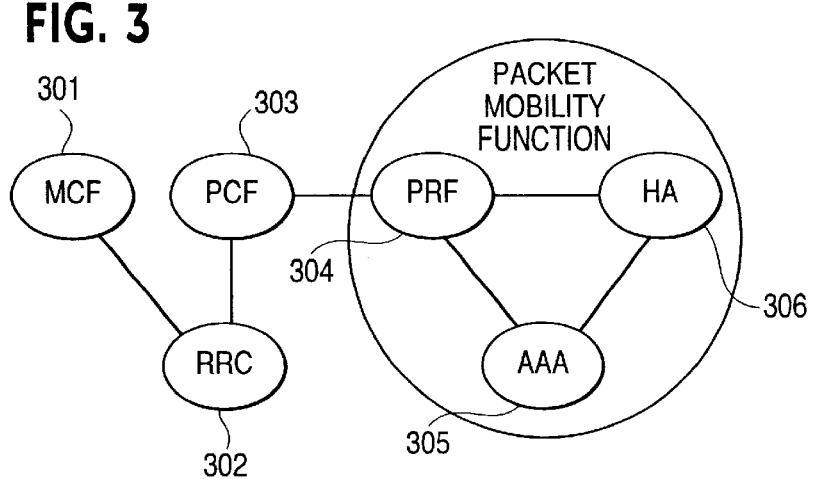
FIG. 3 is a simplified diagram of the functions in a cdma2000 communications network.

FIG. 3 illustrates the relationship among various functional entities providing functions needed to support packet data services in a cdma2000 packet switched network. These functional entities do not necessarily correspond to different physical network elements. It is important to understand the partitioning of these functions so that a single function can be described as on only one side of an interface.

The Mobile Client Function (MCF) 301 requests appropriate radio resources for the exchange of packets, maintains knowledge of status of radio resources for packet service between the mobile station and the radio network (e.g., active, standby, dormant), buffers packets from the mobile client when radio resources are not in place or are insufficient to support the flow to the network, detects a change in the Packet Zone ID information (PZ_ID) from the system overhead message and when dormant, sends an Origination message to PCF 303.

The Radio Resources Control (RRC) function 302 establishes, maintains and terminates radio resources for the exchange of packets between the mobile station and PCF 303. It also broadcasts a Packet Zone ID (PZ_ID) in the system overhead message so that a mobile station can detect the Packet Zone ID (PZ_ID).

The Packet Control Function (PCF) 303 focuses on unique aspects of the radio link for wireless data. It receives and uses packet data service profile of a mobile station for hard handoff and interacts with PRF 304 to maintain a PPP connection as a part of a dormant handoff. As part of the hard handoff to RRC 302, PCF 303 forwards serving PCF information to a target PCF to re-establish the packet connection to PRF 304. PCF 303 relays packets between the mobile station and the PRF 304 and buffers packets arriving from PRF 304 when radio resources are not in place or are insufficient to support the flow from the PRF 304. It also maps IMSI and a connection reference to a unique link layer identifier used to communicate with PRF 304 and collects/sends accounting information (e.g., identification to the location) to PRF 304. A single PCF function may support one or more Base Station Controllers (BSCs) in a network.

The Home Agent (HA) Function 306, Packet Routing Function (PRF) 304, and Authentication, Authorization and Accounting (AAA) Function 305 are closely related packet mobility functions. Although shown separately in FIG. 3, they may be integrated with each other.

Packet Routing Function (PRF) 304 sets up, maintains, and terminates the link layer connection to the mobile client and also interacts with PCF 303 to establish, maintain and terminate a connection at the next higher layer of the protocol stack. It also interacts with a serving PCF 303 and a target PCF 303 to maintain PPP connection to a mobile client as part of a hard handoff or dormant handoff. PRF 304 routes packets to external packet data networks (or to HA 306 in the case of tunneling to HA 306). It assigns the IP address for Simple IP (the dynamic address may be chosen by the PRF 304 or AAA 305) and maps the Network Access Identifier (NAI) and mobile client IP address to the Mobile Identifier and unique identifier used to communicate with PCF 303. A PRF 304 may interact with a previous Packet Routing Function to obtain the address of the Home Agent Function for a mobile client, security information for authentication, and QoS and packet service parameters for the mobile client. PRF 304 records usage data, receives accounting information from PCF 303, correlates it, and relays it to AAA 305.

Authentication, Authorization, and Accounting (AAA) function 305 interacts with PRF 304, HA 306 and other networks to provide a secure mechanism to authorize, authenticate, and perform accounting for a mobile client sending a registration request. AAA 305 also maintains and provides a user profile and QoS information to PRF 304. It may also assign a dynamic IP address for Mobile IP and/or Simple IP services.

The Home Agent (HA) Function 306 authenticates packet data service for the mobile client, redirects packets to foreign agents, may establish, maintain, and terminate secure communications to a foreign agent using security information provided by the home AAA function 305 via the local AAA server, receives provisioning from AAA 305 for users, may assign a dynamic IP address, and verifies mobility requests from the mobile client.

Figure 4:
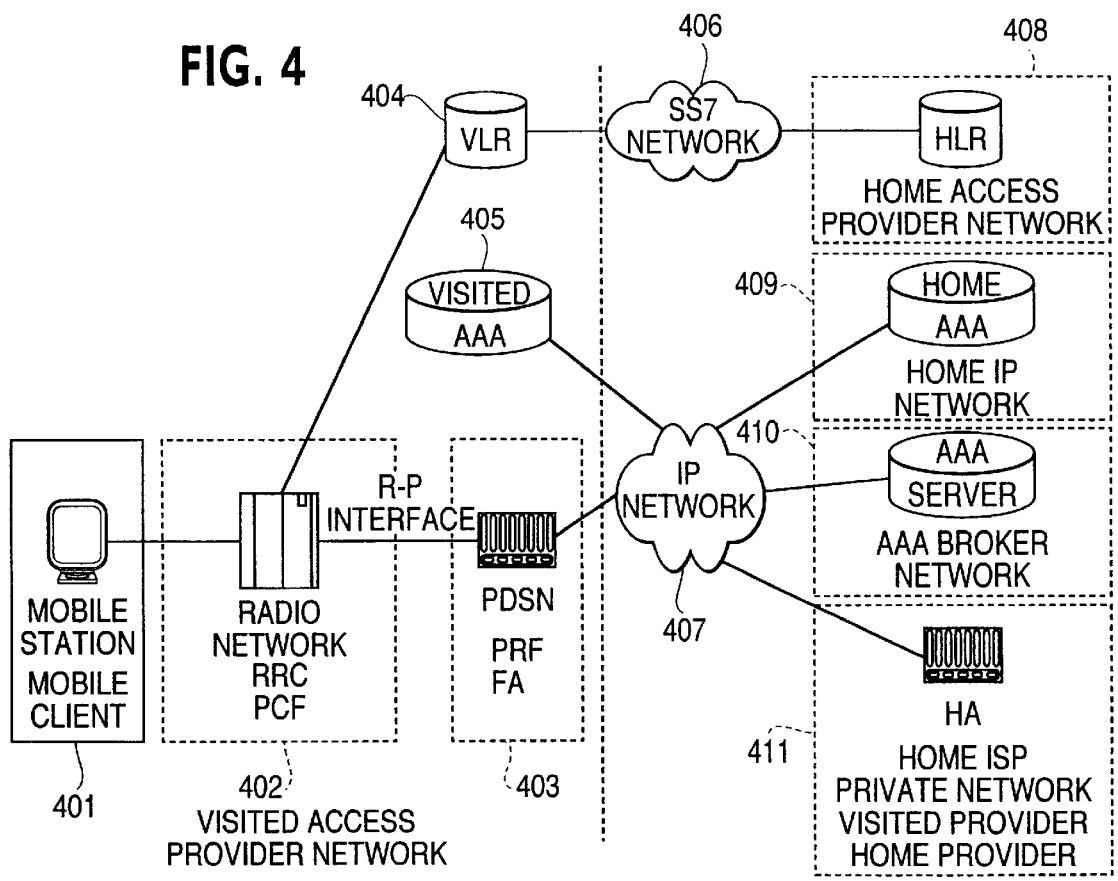
FIG. 4 is a block diagram illustrating the architecture of a cdma2000 packet data communications network.

A basic architectural model of a cdma2000 network is depicted in FIG. 4 which shows an exemplary mapping of the above functional entities to network elements. Packet Data Serving Node (PDSN) 403 implements the functions of PRF 304 (which includes an FA), and may or may not correspond exactly to the PDSN defined in ITU document Q.1711. The mobility management between multiple PDSNs, and the interfaces to other elements, are based on IETF protocols.

The Radio Network (RN) 402 includes multiple Base Station Controllers (not shown) and implements the functions of PCF 303 and RRC 302. As described above, PCF 303 focuses on wireless data unique aspects of the radio link and may support one or more BSC network entities as defined in the TR45 Network Reference Model. The R-P Interface between RN 402 (implementing PCF 303) and PDSN 403 (A10/A11) is an open interface while the connections between the base station controllers and PCF 303 in RN 402 have many proprietary elements.

PDSN 403 can assign a user's packets to a specific differentiated QoS service class on a per packet basis for transport across IP network 407. It 403 sends accounting information to AAA server 410 on a periodic basis or other configurable parameter basis (e.g., space, volume etc.). The interface between the PDSN 403 and AAA server 410 supports the reliable AAA protocol. The AAA server 410 sends accounting information associated with visiting mobile stations to the appropriate home network AAA server 409 using an AAA protocol specially designed for the cdma2000 network. That exchange allows the home network AAA server 409 to re-request/re-poll any previously sent accounting information. The home network AAA server 409 will then send the accounting information to appropriate downstream billing servers.

EXAMPLE EMBODIMENT

As described above, a problem may arise wherein a particular wireless access network has been implemented and it is desired to connect the wireless access network to a packet switched core network with which it is not entirely compatible. As an example, this embodiment of the invention addresses a circumstance wherein it is desired to use a GPRS packet switched network with a cdma2000 wireless access network.

Looking at FIGS. 1, 2 and 4, it can be seen that the GPRS packet switched network utilizes an Iu interface or an Iu-ps interface to a wireless access network while the cdma2000 network utilizes the R-P interface shown in FIG. 4. Furthermore, it can be seen that it will be necessary for the GPRS packet switched network to provide the functions of PRF 304 and the foreign agent contained in PDSN 403 of FIG. 4. However, the cdma2000 system uses packet zones and packet zone identifiers (PZ_IDs) to perform the functions of PCF 303 and PRF 304 while the GPRS network uses routing areas identified by Routing Area Identifiers (RA_IDs) to perform equivalent functions.

Figure 5:
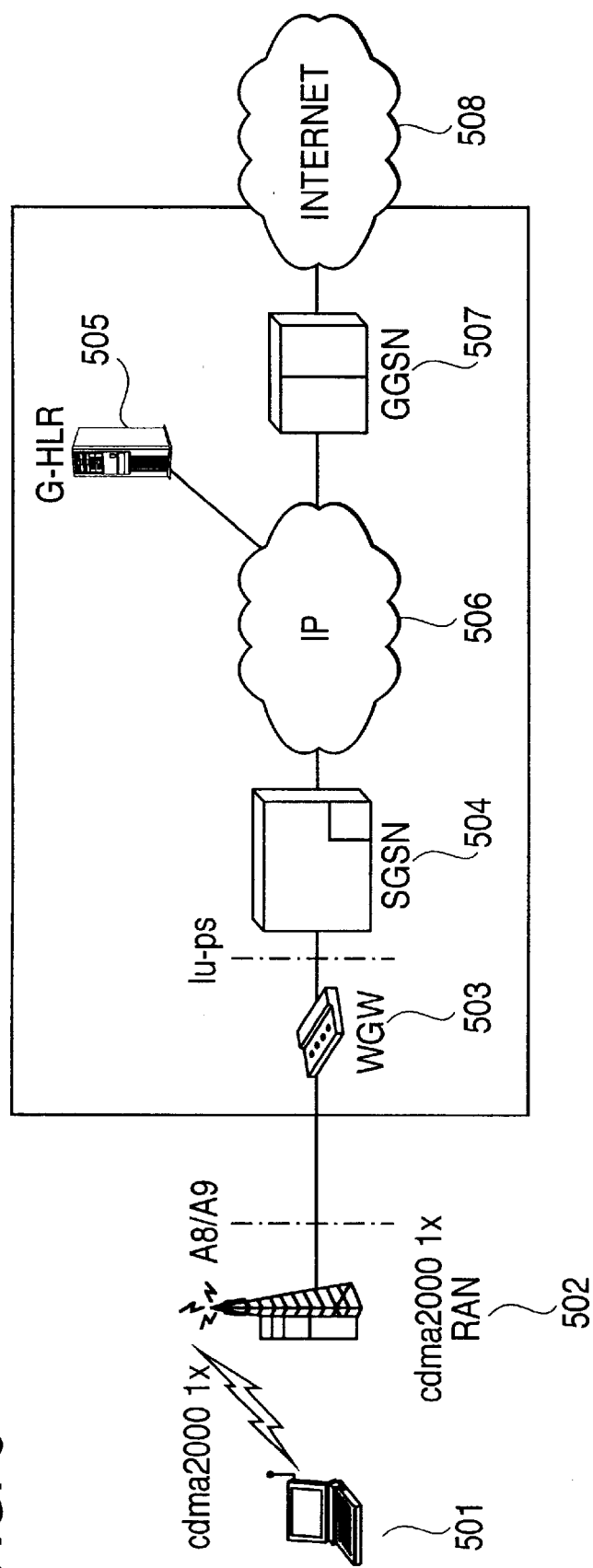
FIG. 5 is a simplified diagram depicting the architecture of an example embodiment of the invention having a GPRS packet switched network with a wireless gateway (WGW) connected to a cdma2000 wireless network.

As shown in FIG. 5, the example embodiment of the invention uses a Wireless Gateway (WGW) 503 including an internet working function. WGW 503 is connected to PCF 303 (contained in cdma2000 RAN 502 in FIG. 5) with A10/A11 protocol, to a Mobile Station 501 and Authentication Center (AuC) with Mobile IP protocol, to GPRS-HLR (G-HLR) 505 using MAP protocol and to SGSN 504 using IU-ps protocol. WGW 503 uses information from the cdma2000 wireless access network as a trigger to execute a session initiation (e.g. Attach) or handoff (e.g. Routing Area Update).

Specifically, the method according to the example embodiment of the invention maps the cdma2000 system PZ_ID to the GPRS RA_ID and sends the previous PZ_ID to the target WGW so that either the GPRS Attach or the GPRS RA Update procedure can be executed. This is preferably done by modifying the Handoff Completion message to carry the previous PZ_ID to the target Base Station Controller (BSC). The A9-Setup-A8 message should use the User Zone ID to carry the previous PZ_ID to PCF 303. The A11 Registration Request message should utilize the Vendor Specific Extension to carry the previous PZ-ID and to indicate the status via a DRS parameter to WGW 503. WGW 503 preferably maintains a list that maps the neighboring PZ_IDs and the neighboring RA_IDs so that the previous PZ_ID can be mapped to previous RA_ID.

In a new session initiation or dormant handoff, the BSC in cdma RAN 502 gets the previous PZ_ID (8 bits) from the cdma2000 Origination message sent by mobile station 501 and then stores it for the corresponding mobile station. The reason why the PZ_ID is captured is as follows: The base station controller sends a CM Service Request to the MSC. The packet data service option triggers the MSC to send a message to the BSC to establish an air interface traffic channel and the A8 connection to the PCF 303. Then PCF 303 sends a message to establish the A10 connection to WGW 501. The cdma2000 Origination message has the previous PZ_ID (8 bits) that can be carried by the CM Service Request message to the MSC. The MSC does not send the PZ_ID anywhere else since only the MSC needs to know the mobile's PZ_ID. Therefore, the BSC is able to get the PZ_ID from the cdma2000 Origination message and store it for each associated mobile.

In the case of a hard handoff, none of the Handoff Required, Handoff Request, Handoff Request Ack, Handoff Command and Handoff Commenced messages carry any User Zone ID. During handoff, the cdma2000 General Handoff Direction or Universal Handoff Direction messages contains the PZ_ID of the target cell ("target PZ_ID"). Before mobile station 501 updates the stored PZ_ID to be the target PZ_ID, mobile station 501 sends the serving cell PZ_ID (which becomes the previous PZ_ID for the target cell) through the previous PZ_ID field in the modified cdma2000 Handoff Completion message to the target WGW and target BSC. After sending the previous PZ_ID, mobile station 501 updates the stored PZ_ID from the previous PZ_ID to the target PZ_ID that becomes the current serving PZ_ID.

The BSC carries the previous PZ_ID forward to WGW 503 through an A9-Setup-A8 message using the User Zone ID field (16 bits) and A11 Registration Request message using the PZ_ID field in the modified Vendor Specific Extension field.

Each WGW 503 maintains a list that associates the neighboring PZ_ID to the neighboring RA_ID. But it may not be possible for the WGW to maintain a list that associates the PZ_ID to the RA_ID for all cdma2000 wireless system operators in the communications network. In the handoff case, the mobile 501 moves from one cell to another cell and the neighboring cell concept makes accomodation for the mapping of the PZ_ID to the RA_ID. If and when a new session is initiated (e.g. at power on), the mobile 501 may come from a non-neighboring cell, but the previous PZ_ID will not be used. WGW 503 uses the list to obtain the previous RA_ID from the received PZ_ID (as the previous PZ_ID). The RA_ID has one or more PZ_IDs, therefore the previous RA_ID can be mapped to the same or to a different PZ_ID than the target RA_ID. If the RA_ID has only one PZ_ID, the previous RA_ID is always different than the target RA_ID. On the other hand, one PZ_ID can only belong to one RA_ID.

When the A8 and A10 connections are completed, the mobile 501 initiates the Mobile IP (MIP) registration to the AuC. Mobile 501 sends the MIP Registration Request message to the AuC via WGW 503. If the MIP registration is accepted, then WGW 503 initiates one of the following three different optional procedures depending on the DRS option in the Vendor Specific Extension field in the A11 Registration Request.

If the DRS option in the Vendor Specific Extension field in the A11 Registration Request is not included, WGW 503 initiates the GPRS Attach procedure immediately followed by GPRS PDP Context Activation. PCF 303 does not include the DRS if the A9 indicators field in the A9-Setup-A8 message has the Handoff Indicator set to 0, regardless of the Data Ready Indicator setting. If the DRS option in the Vendor Specific Extension field in the A11 Registration Request is set to "dormant handoff", WGW 503 initiates the GPRS RA Update procedure. PCF 303 sets the DRS to "dormant handoff" if the A9 Indicators field in the A9-Setup-A8 message has the Handoff Indicator set to 1 and the Data Ready Indicator set to 0. If the DRS option in the Vendor Specific Extension field in the A11 Registration Request is set to a new value "hard handoff", WGW 503 initiates the GPRS RA Update procedure. PCF 303 sets the DRS to "hard handoff" if the A9 Indicators field in the A9-Setup-8 message has the Handoff Indicator set to 1 and the Data Ready Indicator set to 1. This scheme allows WGW 503 to appropriately trigger the GPRS Attach or GPRS RA Update procedures even the GPRS packet switched network was not specified to be connected to the cdma2000 wireless access network.

Figure 6:
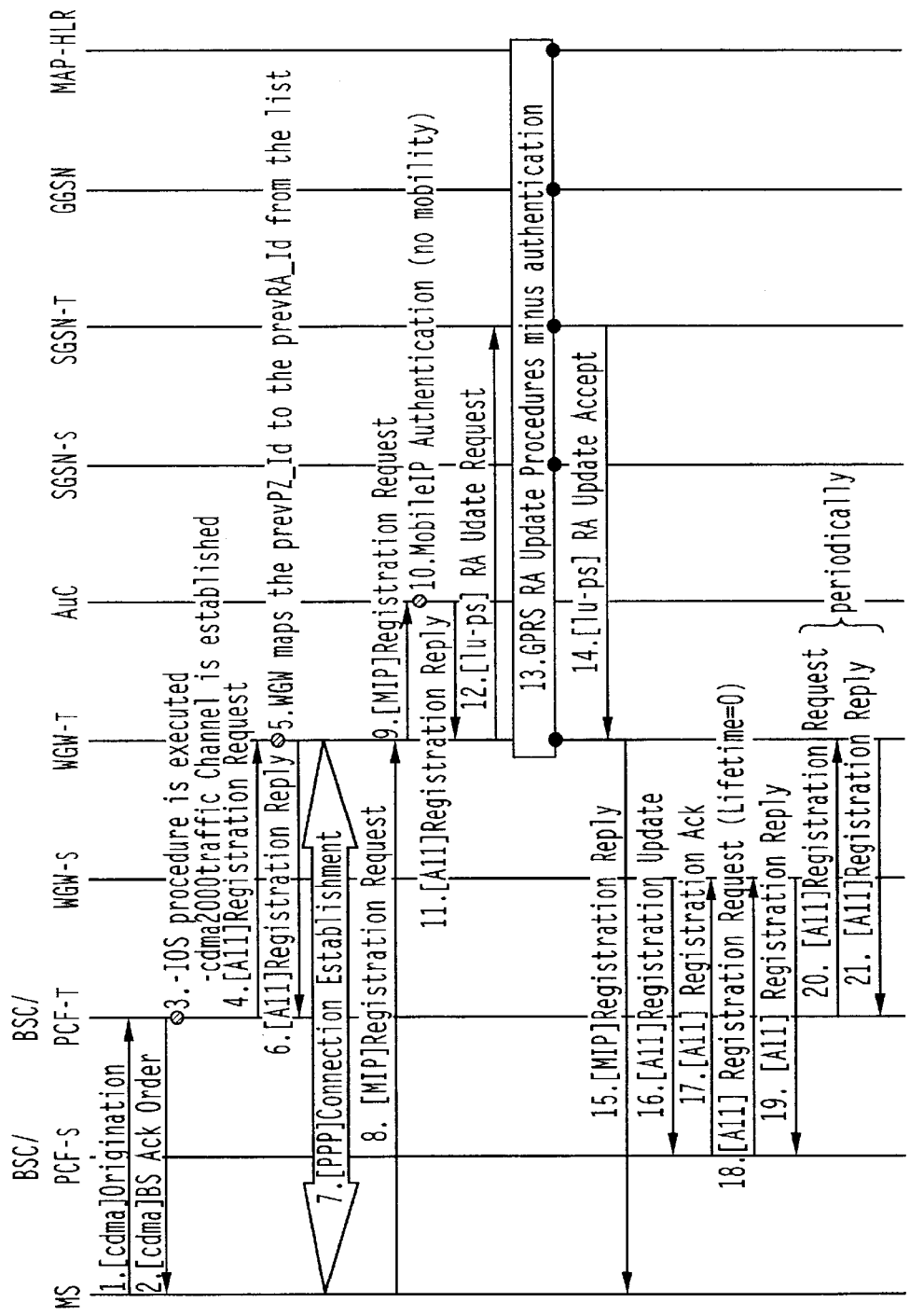
FIG. 6 is a signaling diagram of an example method of the invention for initiating a new session or a dormant handoff in the architecture of FIG. 5.

FIG. 6 illustrates a Routing Area Identifier (RA_ID) Update method in the GPRS packet switched network which is triggered by an inter-PCF idle handoff. The RA Identifier Update method needs the previous RA_ID from the previous WGW/SGSN. As decribed above, the cdma2000 wireless network utilizes packet zone identifiers and a plurality of neighboring PZ_IDs may correspond to a single RA_ID. Upon receiving the previous PZ_ID, the target WGW maps the previous PZ_ID to the previous RA_ID and uses the previous RA_ID for RA_ID Update methods.

In step 1 of FIG. 6, registration to the cdma2000 packet data system is initiated through the cdma2000 Origination message. The PCF in the BSC ("BSC/PCF-T") sends an acknowledgement to the mobile station (Step 2).

Then, procedures are executed as decribed in the cdma2000 specification. The user is authenticated during circuit switched registration in the wireless network. The service option inside the cdma2000 Origination message/ CM Service Request message contains the packet data service (PDS) option. Upon receiving these messages, the MSC/VLR checks whether the user subscribes to packet data service. Only if the user is a package data subscriber, the MSC will send an Assignment Request message to the BSC/PCF (Step 3 in FIG. 6).

The BSC/PCF recognizes that there is no A10 connection associated with the mobile. The target BSC/PCF sends the A11 Registration Request message to the target WGW. This message carries the old PZ_ID from the mobile station (Step 4).

The target WGW maps the previous PZ_ID to the previous RA_ID based on the list of neighboring PZ_IDs and the corresponding neighboring RA_ID maintained by the WGW. The WGW stores the previous RA_ID associated to the mobile station. The previous RA_ID may the same or different than the target RA_ID. This list allows one RA_ID to cover one or more PZ_IDs but one PZ_ID can only have one RA_ID. (Step 5)

After the Registration Request message is verified, the WGW sends a Registration Reply message to the BSC/PCF. (Step 6) At this point, the WGW and the BSC/PCF create a binding record for the A10 connection. Upon receiving the A11 Registration Reply message, the BSC/PCF sends an Assignment complete message to the MSC. The mobile stations and WGW then establishes a PPP connection (Step 7).

Next, the mobile station sends an MIP Registration Request message to the WGW (Step 8). The mobile station includes the authentication extension in the Registration Request message. Upon receiving this message, the WGW will not try to interpret the content of the message. The WGW makes the association between the MS and the previously solved previous RA_ID and then it forwards this message to the AuC (Step 9). The WGW adds another authentication extension to secure the data between the WGW and the AuC since the WGW and the AuC is most likely passed along the insecure internet. The WGW and AuC share a statically distributed security key.

The AuC verifies that the data or message is sent by the WGW and is unmodified from the added authentication extension. Then, the AuC verifies that the message is sent from the mobile station (the mobile station and the AuC share another security key as well) and is unmodified based upon the first authentication extension (Step 10 in FIG. 6). The AuC sends back the MIP Registration Reply message to the mobile station via the WGW. Again this message also has two authentication extensions, one is between the AuC and the WGW using the secret key shared between the two network elements, and the other one is between the AuC and the MS using another security key shared between the mobile station and the AuC. (Step 11).

Upon receiving the MIP Registration Reply message, the WGW verifies that the registration has been accepted (or rejected) by the AuC from the "code" parameter in the fixed portion of the message. The WGW also verifies that the message is from the AuC and unmodified between the AuC and the WGW. If the MIP Registration Reply has an accept indication and the WGW has the previous RA_ID of the associated mobile station, the WGW sends an Iu-ps interface Routing Area (RA) Update Request message to the SGSN (Step 12). The WGW delays the forwarding of the MIP Registration Reply message to the mobile station. The Iu-ps interface RA_ID Update Request message triggers the entire GPRS attach method except for the GPRS authentication (Step 13) since the authentication procedure has been taken care of by the Mobile IP Protocol to enable mobility. The RA_ID Update method updates the MAP HLR and the SGSN sends the Iu-ps interface RA_ID Update Accept message to the WGW (Step 14).

Upon receiving the RA_ID Update message, the WGW forwards the delayed MIP Registration Reply message to the MS (Step 15). Upon expiration of the lifetime, the old WGW sends the A11 Registration Update message to begin to close the A10 connection (Step 16). The old BSC/PCF responds with an A11 Registration Acknowledge message (Step 17) and sends the A11 Registration Request message (with lifetime=0) to the old WGW with accounting related data (Step 18). The old WGW stores the accounting related data and sends an A11 Registration Reply message (Step 19). The old BSC/PCF closes the A10 connection for the mobile station.

The BSC/PCF sends the A11 Registration Request message to the WGW before the lifetime timer expires (Step 20). The WGW sends the A11 Registration Reply message with an accept indication and a new lifetime value (Step 21).

Figure 7:
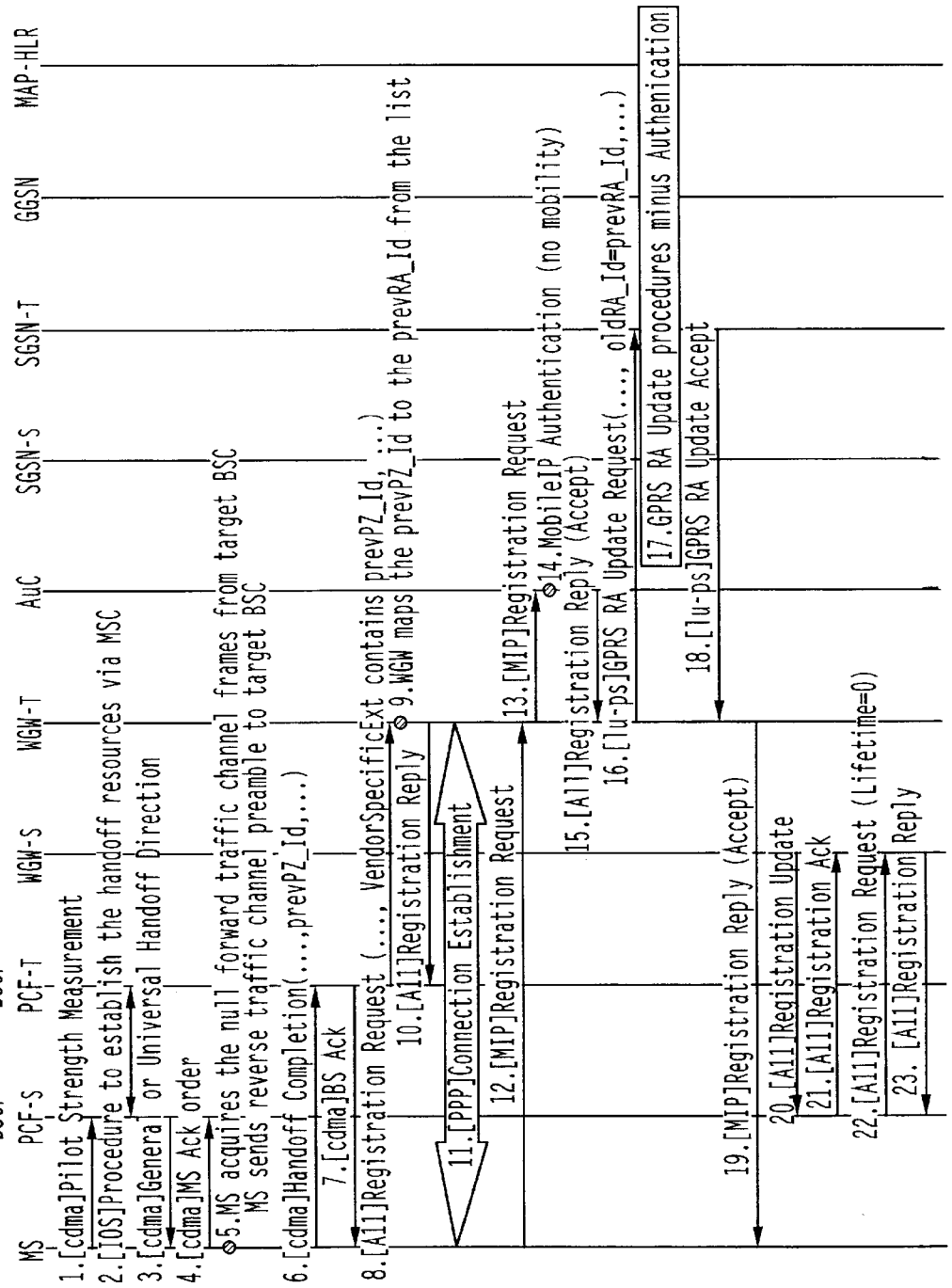
FIG. 7 is a signaling diagram of an example method of the invention for initiating a hard handoff in the architecture of FIG. 5.

FIG. 7 shows a RA_ID Update method in the GPRS packet switched network which is triggered by an inter-PCF hard handoff. In order to determine when a hard handoff is necessary, the mobile station sends a cdma2000 Pilot Strength Measurement message to the serving BSC (Step 1). The serving BSC decides when a hard handoff is required based on the pilot strength measurement. When the hard handoff is required, the serving BSC sends an A1 Handoff Required message to the MSC. The MSC sends a Handoff Request message to the target BSC. The target BCS prepares the requested resources for the handoff, starts sending Null forward traffic channel frames, and returns the A1 Handoff Request Acknowledgement to the MSC. The MSC sends the A1 Handoff Command message to the serving BSC. (See Step 2 in FIG. 7).

The serving BSC sends a cdma2000 General Handoff Direction message or Universal Handoff Direction message to the mobile station (Step 3). The handoff direction message includes the target PZ_ID. The mobile station acknowledges the receipt of the handoff direction message (Step 4).

The mobile station acquires the null forward traffic channel frames from the target BSC, and the mobile station starts sending the Reverse Traffic Channel Preamble (Step 5). The mobile station sends a cdma2000 Handoff Completion message to the target BSC. This message is modified to include the serving (previous PZ_ID stored in the mobile station. Once the previous PZ_ID is sent, the mobile station updates the stored PZ_ID with the target PZ_ID received from the handoff direction message. The BSC forwards the previous PZ_ID using User Zone ID in the A9-Setup-8 message to the PCF (Step 6).

The BSC acknowledges the receipt of the handoff completion message (Step 7). The PCF sends an A11 Registration Request message to the WGW with the previous PZ_ID in the Vendor Specific Extension to the target WGW (Step 8). The target WGW maps the previous PZ_ID to the previous RA_ID according to the list maintained by the WGW (Step 9). The WGW stores the previous RA_ID. The previous RA_ID may be the same or different than the target RA_ID. This list allows one RA_ID to cover one or more PZ_IDs but one PZ_ID can only have one RA_ID.

The target WGW sends an A11 Registration Reply message to the target PCF with an accept indication and the target PCF sends an A9-Connect A8 message to the target BSC (Step 10). When the air interface, the A8 and the A10 connections are established, the mobile station establishes a PPP connection to the targer WGW (Step 11).

The mobile station sends a MIP Registration Request message to the AuC via the target WGW (Step 12) and the target WGW formats the message to the AuC (Step 13). The AuC performs Mobile IP authentication (Step 14) and sends back the A11 Registration Reply to the mobile station via the target WGW (Step 15). The target WGW delays the forwarding of this message to the mobile station.

If the A11 Registration Reply message indicates that the MIP registration is accepted, and the previous PZ_ID is different than the target PZ_ID, the WGW sends the Iu-ps interface GPRS RA_ID Update Request to the SGSN (Step 16). The GPRS executes the RA_ID Update procedures without the authentication procedure (Step 17). Upon completion of the GPRS RA_ID Update method, the SGSN sends the Iu-ps interface RA_ID Update Accept message to the target WGW (Step 18). The WGW then forwards the previously received A11 Registration Reply message to the mobile station (Step 19). Upon expiration of the lifetime, the serving (previous) WGW initiates the A8 and A10 cancellation (only A10 cancellation is shown for clarity) to the serving (previous) PCF and the serving (previous) PCF continues to the procedure to the serving (previous) BSC (Steps 20–23).

While the foregoing has described what are considered to be example embodiments of the invention, it is understood that various modifications may be made therein and that the invention may be implemented in various forms and embodiments, and that it may be applied in numerous applications, only some of which have been-described herein. It is intended by the following claims to claim all such modifications and variations.

What is claimed is:

1. A method of triggering a new session or handoff procedure for a user equipment in a communications system having a second network connected to a first network, the method comprising the steps of:
   determining a first identifier from the first network indicating the location of the user equipment in the first network;
   providing said first identifier to an entity connected to said first network and to said second network, said entity associating a second identifier of the second network with said first identifier of said first network, the first identifier indicating the location of the user equipment in the first network and said second identifier indicating the location of the user equipment in the second network; and
   determining the second identifier of the second network indicating the location of the user equipment using said entity for associating said first identifier and said second identifier.

2. The method as recited in claim 1, wherein a controller obtains the first identifier of said first network, indicating the location of said user equipment in said first network, from the user equipment.

3. The method of claim 2, wherein the first identifier is a previous first identifier.

4. The method of claim 2, wherein the controller is a base station controller.

5. The method recited in claim 2, wherein the user equipment updates its stored first identifier with the first identifier sent by the network from the controller to the entity.

6. The method recited in claim 5, wherein said entity finds a correspondence between a previous first identifier from the first network and a second identifier from the second network.

7. The method recited in claim 5, wherein a plurality of first identifiers from said first network correspond to a single second identifier from said second network.

8. The method recited in claim 6, wherein said entity returns a registration reply to the controller after it has found a correspondence between said previous first identifier from the first network and a second identifier from the second network.

9. The method of claim 1, wherein the first identifier is a PZ_ID parameter and the second identifier is a RA_ID parameter.

10. The method of claim 1, wherein the first identifiers are PZ_ID and Cell-ID parameters and the second identifier is a RA_ID parameter.

11. The method recited in claim 8, wherein a PPP connection is established between the user equipment and the said entity.

12. The method recited in claim 6, wherein said entity sends an RA update request to a network element in the second network.

13. The method recited in claim 1, wherein said entity is a wireless gateway (WGW).

14. The method recited in claim 12, wherein said RA update request is sent over a standardized interface of said packet switched network.

15. The method recited in claim 14, wherein said second network is a GPRS network and said network element is a Serving GPRS Support Node (SGSN).

16. The method recited in claim 14, wherein said second network updates its second identifier indicating the location of the mobile station.

17. The method recited in claim 16, wherein said packet switched network sends a message to the gateway indicating that it has updated its identifier indicating the location of the mobile station.

18. The method of claim 1, wherein the first network is an access network and the second network is a core network.

19. The method of claim 18, wherein the access network is a cdma2000 network and the core network is a GPRS network.

20. The method of claim 1, wherein said user equipment is a mobile station.

21. The method of claim 1, wherein a DRS option in a registration request indicates when an attach procedure or handoff procedure is carried out.

22. A communications system, comprising at least:
   an access network;
   a packet switched core network; and
   a gateway connected between the access network and the packet switched core network, said communications system implementing a method according to claim 1 which triggers the updating of an identifier in the packet switched core network indicating the location of a user equipment in the access network.

23. A communications network according to claim 22, wherein said gateway is a wireless gateway.

24. A communications network according to claim 23, wherein said wireless gateway connects to said wireless access network through an interface of said wireless access network.

25. A communications network according to claim 24, wherein said interface is a standardized A10/A11 interface.

26. A communications network according to claim 23, wherein said wireless gateway connects to said packet switched core network through a standardized interface of said packet switched core network.

27. A communications network according to claim 23, where the data identifier in said packet switched core network indicating the location of the mobile station is different than the data identifier in the wireless access network indicating the location of the mobile station.

28. A communications network according to claim 23, wherein the packet switched core network is a GPRS network and the wireless access network is a cdma2000 network.

29. A communications network according to claim 28, wherein the GPRS network includes a Serving GPRS Support Node (SGSN) which connects to the wireless gateway over a Iu-ps interface.

30. A communication network according to claim 22, wherein the mobile station in the wireless access network connects to an external network through said gateway and said packet switched core network.

31. A communications network according to claim 30, wherein said mobile station receives a communication service with said external network.

32. A communications network according to claim 22, wherein said method implemented by said gateway is triggered by a new session of the mobile station.

33. A communications network according to claim 22, wherein said method implemented by said gateway is triggered by a handoff of said mobile station in said wireless access network.

34. A communications network according to claim 33, wherein said handoff is a hard handoff.

35. A communications network according to claim 33, wherein said handoff is a dormant handoff.

* * * * *